Patented May 6, 1930

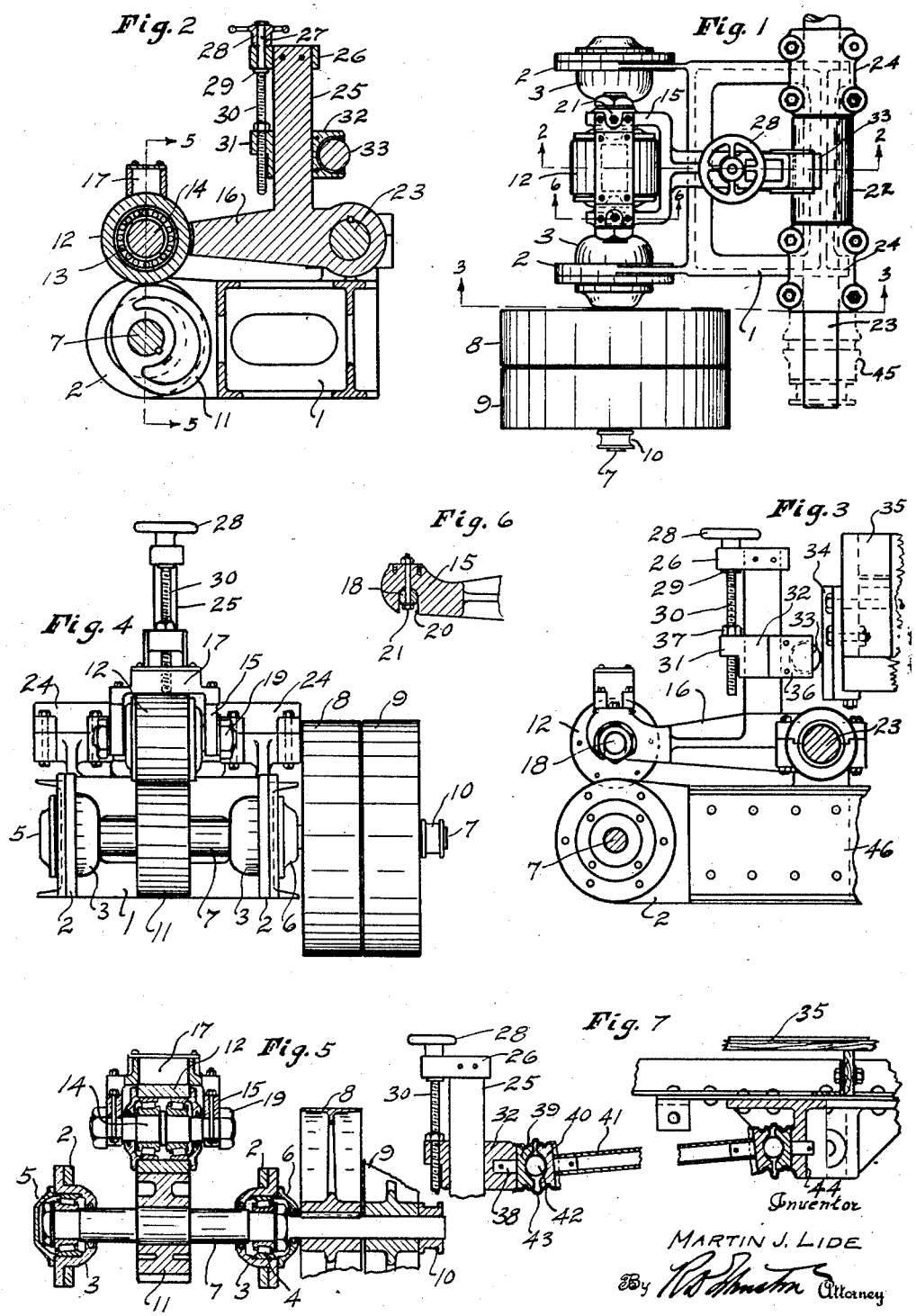

1,757,320

UNITED STATES PATENT OFFICE

MARTIN J. LIDE, OF BIRMINGHAM, ALABAMA

ACTUATING MECHANISM FOR CONCENTRATING MACHINERY

Application filed March 10, 1926. Serial No. 93,603.

This invention relates to a new and improved type of actuating mechanism for imparting oscillatory movement to concentrating machinery, such as concentrating tables, whether wet or dry, and the like.

The object of my invention is to devise a drive mechanism having parts which can be produced at relatively small cost and are capable of being readily assembled and taken apart; which makes ample provision for reducing the friction factor to a minimum; which will provide a high power leverage drive capable of adjustment as to length of stroke and which will act to push the table forward with a slow low powered drive and to permit a quick spring driven return; which interposes roller bearings between all working parts to the end that high speed operation is obtainable; and which is capable of being produced in a compact unit having a steel frame provided with a box end especially adapted for ready assembly with the base or frame support of any desired type of mechanism to be driven thereby.

My invention contemplates a mechanism especially adapted to work as a thrust drive against opposing spring means for oscillating the table and to this end it possesses distinctive features in respect of the construction of its bell crank rocker and the arrangement of its thrust arm for symmetrical play relative to a vertical plane through its axis; the utilization of an antifriction means such as a roller for direct drives and a ball jointed thrust rod for remote drives; the manner of detachably mounting a cam engaging roller in the rocker and of lubricating its surface to prevent friction between it and its driving cam; the provision of a thrust plate on the table to receive the thrusting drive through either a roller or ball; and the provision of means to attach the return springs to the mechanism when desired.

The means by which the foregoing advantages are attained in my present invention are more fully explained in the following specification and pointed out in the appended claims, reference being had to the accompanying drawings which form a part of this specification, and in which:—

Fig. 1 is a plan view of my improved type of drive.

Fig. 2 is a cross-sectional view taken on the line 2—2 of Fig. 1.

Fig. 3 is a side elevation taken on the line 3—3 of Fig. 1, showing the pulley shaft in section and the frame attached to table supports.

Fig. 4 is an end view of the drive mechanism.

Fig. 5 is a sectional view taken on the line 5—5 of Fig. 2.

Fig. 6 is a sectional view taken on the line 6—6 of Fig. 1.

Fig. 7 is a view showing a remote type of drive from the rocker to the separating table with the connecting rod and its ball thrust bearing shown in cross section.

Similar reference numerals refer to similar parts throughout the drawings.

In the embodiment of my invention illustrated in the drawings, I show a frame 1 of box-like structure having at one end parallel fork arms 2 which are provided with aligning openings to receive the bearing housings 3 (see Fig. 5). An antifriction bearing assembly 4 is mounted within each housing 3. A closed cap 5 encloses the bearing assembly in one housing and an open cap 6 encloses the bearing assembly in the other housing. A main drive shaft 7 is mounted in the roller bearing assemblies and has a reduced end extending through the open cap to receive a fast pulley 8 and a loose pulley 9 and a set collar 10. On the shaft 7, midway between the fork arms 2, I mount fast a cam 11 having any desired conformation according to the particular duty required. The cam shown is designed for a quick return stroke. The cam co-acts with a roller 12 mounted above by means of an antifriction bearing assembly 13 upon a shaft 14 made fast in a yoke 15 provided at the outer end of the lower or horizontal arm of a bell crank rocker 16. A lubricant box 17 is mounted on the yoke 15 above the roller 12 and adapted to supply lubricant to the surface of the roller and thus to the cam. The shaft 14 has its outer ends reduced as shown at 18, Fig. 6, and these ends are threaded to receive the nuts 19. The yoke arms 15 have slots 20 opening through their bottom giving them a hook form so that they can be dropped over the ends 18 of the shaft 14, as shown more clearly in Fig. 6. This permits the ready installation of the roller bearing assembly 13. A bolt 21 is passed upwardly through each end 18 of the shaft 14 and through a yoke arm 15 to hold the roller shaft in the yoke free for ready detachment.

The rocker arm 16 is provided at its bearing end with a wide sleeve 22 which is keyed to the shaft 23 between the bearings 24 therefor which are mounted on top of the frame 1 and may be of any suitable character. The bell crank rocker comprises an upright arm 25 offset from a vertical axial plane through the shaft 23 and having secured rigidly to its top a journal bracket 26 for the unthreaded upper end of the screw shaft 27, which above the bracket carries a hand wheel 28 fast thereon and which below the bracket has a shoulder 29. The threaded portion 30 of the adjusting screw is screwed through a lug 31 on a vertically adjustable slide block 32 adapted to slide with a snug fit on the arm 25 of the bell crank. This slide block is recessed at its working end to receive an antifriction roller 33 which, as shown in Fig. 3, engages a thrust plate 34 on a concentrating table 35, which is typical of any concentrating element requiring oscillatory motion to perform its functions. Side plates 36, attached to the slide block on each side, serve to hold the roller 33 against endwise displacement, and a jamb nut 37 upon the screw 30 will hold the slide block in any desired adjusted position.

In some instances it is desirable to provide a remote driving connection between the bell crank rocker and the concentrating table 35, such as is shown in Fig. 7, where the slide block 32 is recessed to receive the shank 38 of a ball seat 39. A corresponding ball seat 40 is mounted in one end of a thrust pipe 41 and after the ball 42 has been inserted in place between the seats a flexible jacket 43 is mounted about the ball so as to protect the joint from dust and to contain a suitable lubricant for the thrust bearing. A similar thrust bearing is provided at the other end of the thrust pipe 41, the outer ball seat being connected to a push block 44 attached to the table.

In many instances it is desirable to provide a means for connecting to the operating mechanism, spring elements utilized to oppose the cam drive of the table, and as a most convenient means to this end I prefer to extend the shaft 23 so that its ends will overhang beyond each bearing 24 as is indicated more clearly in Fig. 1 and receive a suitable spring attaching mechanism 45 shown in dotted lines. By loosening the bolts 21 the roller shaft 14 can be readily detached from the bell crank yoke and the roller can thus be removed and replaced with great ease.

The whole assembly is very compact and is capable of being readily bolted to a supporting frame or base of the concentrating machine, such a frame being formally illustrated by the channels 46 in Fig. 3, which are shown bolted to the sides of the box-like end of the frame for the drive mechanism. The drive unit is thus a self contained piece of mechanism on a frame, capable of being readily attached to and co-ordinated with any type mechanism which requires oscillatory motion to be imparted thereto.

In operation, having assembled the mechanism in the manner described, when the shaft 7 is driven by the fast pulley 8 the cam 11 is rotated and by engagement with the roller 12 the bell crank rocker 16 is oscillated about the shaft 23 as a center and its vertical arm 25 is rocked towards and from the table 35, the extent of the oscillations imparted to the table being subject to adjustment by moving the slide block 32 so as to increase or decrease the radius of its arc of travel. The roller in the one case and the balls 42, with the interposed thrust pipe 41 in the other case, will transmit the oscillations from the bell crank rocker to the table practically without friction, the table being returned by any suitable means, which forming no part of my present mechanism are not shown.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A thrust drive for concentrating tables embodying a bell crank and a cam roller carried by the bell crank characterized by the fact that the lower end of the bell crank comprises a fork in the sides of which the cam roller is mounted and which are slotted out to form open slots, there being a shaft provided for the cam roller which is fixedly mounted in said slots, the roller and its shaft being removable from said slots while assembled.

2. A thrust drive for concentrating tables embodying a bell crank and cam roller carried by the bell crank characterized by the fact that the lower end of the bell crank is forked and provided with two prongs in which the cam roller is mounted, and a lubricating box is connected to the top of the two prongs of the forked lower arm of the bell crank in which the cam roller is mounted, said box being mounted in a manner such that lubricant may be continuously supplied from the box to the surface of the cam roller.

3. A thrust drive for a concentrating table, comprising a frame adapted to be mounted in overhung relation on the concentrating table support and comprising fork arms at its outer end, a driving shaft mounted in said arms, a cam fast on said shaft between said arms, a bell crank rocker journaled on the frame, a roller journaled on one arm of the rocker and adapted to engage the cam, a thrust element for the table adjustably mounted on the other arm of the rocker, and means to lubricate the face of the roller.

4. A thrust drive for a concentrating table, comprising a frame, a cam shaft journaled in the frame, a cam driven by said shaft, a bell crank rocker mounted on the frame and carrying a roller coacting with the cam, a thrust arm, an adjustable thrust element thereon, a shaft on which said rocker is mounted, and means to mount said shaft on said frame with the ends of the shaft overhung for engagement with spring return rigging for the table, substantially as described.

5. A thrust drive for a concentrating table, comprising a box-like frame having fork arms at one end, antifriction bearing housings mounted in said arms, a drive shaft mounted in said bearings and carrying a cam fast thereon, a bell crank rocker pivotally mounted on the box-like frame with one arm thereof provided with a fork, a roller support mounted in the fork, a roller mounted with an antifriction bearing on said support and adapted to engage said cam, and means to lubricate the face of the roller, the other arm of said rocker carrying a slide block having means to adjust it relatively to the axis of the bell crank and having an antifriction thrust element for transmitting its motion to the concentrating table.

6. A thrust drive for a concentrating table, comprising a box-like frame having fork arms at one end, antifriction bearing housings mounted in said arms, a drive shaft mounted in said bearings and carrying a cam fast thereon, a bell crank rocker pivotally mounted on the box-like frame with one arm thereof provided with a fork, a roller support mounted in the fork, and a roller mounted with an antifriction bearing on said support and adapted to engage said cam, the other arm of said rocker carrying a slide block having means to adjust it relatively to the axis of the bell crank and having an antifriction thrust element for transmitting its motion to the concentrating table.

In testimony whereof I affix my signature.

MARTIN J. LIDE.